(12) United States Patent
Sawai et al.

(10) Patent No.: US 7,869,203 B2
(45) Date of Patent: Jan. 11, 2011

(54) DISPLAY SCREEN TURNING APPARATUS

(75) Inventors: Kunio Sawai, Daito (JP); Katsuyuki Yokota, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 567 days.

(21) Appl. No.: 11/842,535

(22) Filed: Aug. 21, 2007

(65) Prior Publication Data

US 2008/0049390 A1 Feb. 28, 2008

(30) Foreign Application Priority Data

Aug. 22, 2006 (JP) ............................. 2006-224819

(51) Int. Cl.
G06F 1/16 (2006.01)
H05K 5/00 (2006.01)
H05K 7/00 (2006.01)
(52) U.S. Cl. .................................. 361/679.22; 248/917
(58) Field of Classification Search ............ 361/679.21, 361/679.22; 248/146, 917, 919
See application file for complete search history.

(56) References Cited

U.S. PATENT DOCUMENTS

| | | | |
|---|---|---|---|
| 3,981,201 A | | 9/1976 | Jeannet et al. |
| 4,591,123 A | * | 5/1986 | Bradshaw et al. ......... 248/179.1 |
| 4,770,382 A | | 9/1988 | Lehti |
| 5,243,434 A | * | 9/1993 | Nodama ...................... 248/919 |
| 5,854,735 A | * | 12/1998 | Cheng .................... 361/679.22 |
| 6,189,842 B1 | * | 2/2001 | Bergeron Gull et al. ..... 248/919 |
| 6,510,049 B2 | * | 1/2003 | Rosen ......................... 248/919 |
| 6,633,347 B2 | * | 10/2003 | Kitazawa .................... 248/919 |
| 6,639,788 B1 | * | 10/2003 | Liao et al. ............. 361/679.22 |
| 6,712,326 B2 | | 3/2004 | Kurimoto et al. |
| 6,826,041 B2 | * | 11/2004 | Yu ......................... 361/679.22 |
| 6,845,546 B1 | * | 1/2005 | Lu et al. ..................... 248/917 |
| 6,883,206 B2 | * | 4/2005 | Yang et al. .................. 248/917 |
| 7,499,272 B2 | * | 3/2009 | Searby et al. .......... 361/679.22 |
| 7,502,219 B2 | * | 3/2009 | Kuga ..................... 361/679.22 |
| 2006/0007644 A1 | * | 1/2006 | Huilgol et al. .............. 248/917 |
| 2006/0118686 A1 | * | 6/2006 | Hsieh et al. ................. 248/919 |

(Continued)

FOREIGN PATENT DOCUMENTS

FR 2 261 509 A1 9/1975

(Continued)

OTHER PUBLICATIONS

European Search Report dated Jan. 30, 2008 (Five (5) Pages).

(Continued)

*Primary Examiner*—Jayprakash N Gandhi
*Assistant Examiner*—Adrian S Wilson
(74) *Attorney, Agent, or Firm*—Crowell & Moring LLP

(57) ABSTRACT

A display screen turning apparatus capable of improving assembling workability in assembling steps and suppressing jolting during rotation can be obtained. This display screen turning apparatus includes a rotating member mounted with a display screen and rotatable in a horizontal plane, a base, rotatably holding the rotating member, provided with an upright portion having a hole, a platelike spring of metal fitted onto the upright portion of the base for pressing the rotating member and a stop member inserted into the hole of the upright portion of the base for pressing the platelike spring and holding the platelike spring in a deflected state.

18 Claims, 12 Drawing Sheets

U.S. PATENT DOCUMENTS

| | | | |
|---|---|---|---|
| 2006/0232527 A1* | 10/2006 | Oh | 361/681 |
| 2007/0030632 A1* | 2/2007 | Cheng | 361/681 |
| 2007/0139871 A1* | 6/2007 | Chiu | 361/681 |
| 2007/0217134 A1* | 9/2007 | Shin | 361/681 |
| 2007/0279850 A1* | 12/2007 | Chiang et al. | 361/681 |

FOREIGN PATENT DOCUMENTS

| | | |
|---|---|---|
| FR | 2 601 435 A1 | 1/1998 |
| JP | 61-63005 U | 4/1986 |
| JP | 63-88399 A | 4/1988 |
| JP | 6-9277 U | 2/1994 |
| JP | 7-240890 A | 9/1995 |
| JP | 11-280992 A | 10/1999 |
| JP | 2003-74787 A | 3/2003 |
| JP | 2005-284087 A | 10/2005 |

OTHER PUBLICATIONS

Japanese Office Action dated Aug. 5, 2008 with English translation (Five (5) pages).

* cited by examiner

DISPLAY SCREEN TURNING APPARATUS

BACKGROUND OF THE INVENTION

1. Field of the Invention

The present invention relates to a display screen turning apparatus, and more particularly, it relates to a display screen turning apparatus comprising a rotating member mounted with a display screen and rotatable in a horizontal plane.

2. Description of the Background Art

A display screen turning apparatus comprising a rotating member mounted with a display screen and rotatable in a horizontal plane is known in general, as disclosed in Japanese Patent Laying-Open Nos. 2003-74787 and 2005-284087, Japanese Utility Model Laying-Open No. 6-9277 (1994) and Japanese Patent Laying-Open Nos. 7-240890 (1995) and 63-88399 (1988), for example.

The aforementioned Japanese Patent Laying-Open No. 2003-74787 discloses a display screen turning apparatus (rotary stand) comprising a base plate, a coupling plate receiving a display (or an audio system) thereon and rotating with the display and a holding plate holding the coupling plate between the same and the base plate and keeping the coupling plate rotatable in the vertical and horizontal directions. In this display screen turning apparatus (rotary stand), the holding plate, the coupling plate and the base plate are superposed with each other in descending order while threaded bolts and springs (compression springs) are inserted into through-holes linearly passing through the holding plate, the coupling plate and the base plate and tightened by prescribed quantities with nuts, so that the coupling plate receives prescribed pressure contact force from the holding plate and the base plate. In this rotary stand, the coupling plate rotates with the display while producing prescribed frictional force.

The aforementioned Japanese Patent Laying-Open No. 2005-284087 discloses a display screen turning apparatus comprising a base member, a bracket member receiving a thin display thereon and horizontally turning with the thin display and a plate (friction disc) interposed between the base member and the bracket member. In this display screen turning apparatus, the bracket member, the plate and the base member are superposed with each other in descending order while threaded bolts and springs (compression springs) are inserted into through-holes linearly passing through the bracket member, the plate and the base member and tightened by prescribed quantities with nuts, so that the plate receives prescribed pressure contact force from the bracket member and the base member. In this display screen turning apparatus, the bracket member horizontally turns with the thin display while producing prescribed frictional force.

The aforementioned Japanese Utility Model Laying-Open No. 6-9277 discloses a display screen turning apparatus (angle regulator) comprising a bearer, an angle regulating stand receiving a display thereon and rotating with the display and a holding shaft, having a T-shaped section, holding the angle regulating stand between the same and the bearer and keeping the angle regulating stand rotatable in the vertical direction. In this display screen turning apparatus (angle regulator), the angle regulating stand and the bearer are superposed with each other in descending order while the holding shaft is inserted into a through-hole linearly passing through the angle regulating stand and the bearer so that one side of the holding shaft is prevented from downward displacement from the upper surface of the angle regulating stand by the T-shaped section and a spring (compression spring) is inserted into the holding shaft from an end having no T-shaped section and covered with a washer screwed to the holding shaft, whereby the holding shaft having the T-shaped section holds the angle regulating stand and the bearer with prescribed pressure contact force. In this display screen turning apparatus (angle regulator), the angle regulating stand rotates with the display while producing prescribed frictional force between the same and the bearer.

The aforementioned Japanese Patent Laying-Open No. 7-240890 discloses a display screen turning apparatus (cabinet rotator) comprising a base having an arcuate groove, a roller rolling along the arcuate groove and a bottom plate having a cabinet body (display) provided with an arcuate rib on the bottom thereof. In this display screen turning apparatus (cabinet rotator), the arcuate rib formed to be undisplaceable from the arcuate groove of the base moves on the roller rolling along the arcuate groove, thereby horizontally turning the heavy cabinet body on the base.

The aforementioned Japanese Patent Laying-Open No. 63-88399 discloses a display screen turning apparatus (reverser for a surveillance television camera or the like) comprising a circular rotor plate having a rotating shaft directly connected to a surveillance television camera, a roller rotating in contact with a hole whose inner side surface is cut into a C shape in plan view to have a smooth continuous curved surface in this rotor plate, a motor directly connected to the rotating shaft of the roller and a cam mechanism capable of regularly pressing the roller to come into contact with the inner side surface of the rotor plate regardless of the position in contact with the inner side surface of the roller when the roller rotates in contact with the inner side surface of the rotor plate cut into the C shape. In this display screen turning apparatus (reverser for a surveillance television camera or the like), the roller regularly rotates in the same direction through the motor and is regularly in contact with the C-shaped inner side surface of the rotor plate through the cam mechanism, so that the roller rotationally moves along the inner side surface of the rotor plate and the rotor plate repeats rotating while periodically reversing the rotational direction.

According to the aforementioned Japanese Patent Laying-Open No. 2003-74787, however, the conventional display screen turning apparatus (rotary stand) is conceivably assembled by meshing the nuts with the threaded bolts for controlling the shrinkage of the springs (compression springs) so that the coupling plate receives the prescribed pressure contact force from the holding plate and the base plate, to require a step of controlling the pressure contact force (shrinkage of the springs). Thus, the assembling operation is so complicated that it is difficult to improve assembling workability.

According to the aforementioned Japanese Patent Laying-Open No. 2005-284087, the conventional display screen turning apparatus is conceivably assembled by meshing the nuts with the threaded bolts for controlling the shrinkage of the springs (compression springs) so that the plate receives the prescribed pressure contact force from the bracket member and the base member, to require a step of controlling the pressure contact force (shrinkage of the springs). Thus, the assembling operation is so complicated that it is difficult to improve assembling workability.

According to the aforementioned Japanese Utility Model Laying-Open No. 6-9277, the conventional display screen turning apparatus (angle regulator) is conceivably assembled by meshing a nut and the washer with a threaded bolt of the holding shaft having the T-shaped section for controlling the shrinkage of the spring (compression spring) so that the angle regulating stand and the bearer receive the prescribed pressure contact force from the holding shaft having the T-shaped section, to require a step of controlling the pressure contact force (shrinkage of the spring). Thus, the assembling operation is so complicated that it is difficult to improve assembling workability.

In the conventional display screen turning apparatus (cabinet rotator) proposed in the aforementioned Japanese Patent Laying-Open No. 7-240890, the cabinet body (display) is merely placed on the base by coming into contact with the roller arranged in the arcuate groove of the base opposed thereto through the arcuate rib provided on the bottom thereof, and is conceivably easily inclined through abrupt horizontal force, although the same has stability in the vertical downward direction due to its own weight. Therefore, the cabinet may easily jolt during rotation.

In the conventional display screen turning apparatus (reverser for a surveillance television camera or the like) proposed in the aforementioned Japanese Patent Laying-Open No. 7-240890, the roller merely rotates in contact with only the inner side surface (horizontal direction) of the rotor plate, and the display screen turning apparatus is conceivably provided with no mechanism for inhibiting the rotor plate from displacement in the vertical direction (rotational axis direction) following rotation. Therefore, the rotor plate may easily jolt during rotation, depending on the conditions of use.

SUMMARY OF THE INVENTION

The present invention has been proposed in order to solve the aforementioned problems, and an object of the present invention is to provide a display screen turning apparatus capable of improving assembling workability and suppressing jolting during rotation.

A display screen turning apparatus according to a first aspect of the present invention comprises a rotating member mounted with a display screen and rotatable in a horizontal plane, a base, rotatably holding the rotating member, provided with an upright portion having a hole, a platelike spring of metal fitted onto the upright portion of the base for pressing the rotating member and a stop member inserted into the hole of the upright portion of the base for pressing the platelike spring and holding the platelike spring in a deflected state.

According to the first aspect of the present invention, as hereinabove described, the display screen turning apparatus comprises the stop member inserted into the hole of the upright portion of the base for pressing the platelike spring and holding the same in a deflected state, whereby assembling workability can be improved through a simple operation of deflecting the platelike spring with a jig or the like to produce prescribed pressing force and inserting the stop member into the hole of the upright portion of the base. Further, the display screen turning apparatus comprises the platelike spring of metal fitted onto the upright portion of the base rotatably holding the rotating member to press the rotating member, whereby the rotating member regularly rotates in the state pressed by the platelike spring with the prescribed pressing force, and can be inhibited from jolting during rotation.

In the aforementioned display screen turning apparatus according to the first aspect, the rotating member preferably includes a first side end surface portion arcuate in plan view while the upright portion of the base preferably includes a first upright portion provided on the rotation center of the rotating member and a second upright portion provided at a prescribed distance from the first upright portion, the second upright portion of the base preferably has a second side end surface portion, and the first side end surface portion of the rotating member preferably substantially comes into contact with the second side end surface portion of the second upright portion when the rotating member rotates in the horizontal plane, so that horizontal movement of the rotating member can be regulated. According to this structure, the rotating member can be inhibited from rotating in a state where the axis of rotation is horizontally decentered when rotating on the upper surface of the base.

In the aforementioned display screen turning apparatus according to the first aspect, the upright portion of the base preferably includes a first upright portion provided on the rotation center of the rotating member and second upright portions provided at a prescribed distance from the first upright portion, and the second upright portions of the base are preferably substantially symmetrically provided on both sides of the rotating member with respect to the first upright portion in plan view. According to this structure, the rotating member is rotatably held by the platelike spring and the stop member in the vicinity of the second upright portions of the base provided on both sides of the rotating member at substantially symmetrical distances from the rotation center, whereby the rotational torque of the rotating member can be inhibited from dispersion resulting from the rotational direction.

In the aforementioned display screen turning apparatus according to the first aspect, the upright portion of the base is preferably integrally formed on the base. According to this structure, no step is required for mounting an upright portion manufactured as an individual component on the base, whereby the assembling workability can be further improved.

In this case, the base is preferably made of sheet metal, and the upright portion of the base is preferably formed integrally with the base by partially uprighting the base. According to this structure, the upright portion can be easily formed at the same time when the base of sheet metal is formed by press working.

In the aforementioned display screen turning apparatus according to the first aspect, the platelike spring is preferably an annularly formed disc spring. According to this structure, the pressing force for deflecting the disc spring by the stop member can uniformly act in the form of a circle having a constant radius along the upright portion of the base.

The aforementioned display screen turning apparatus according to the first aspect preferably further comprises a pressing member of metal for pressing the rotating member rotatably with respect to the base, the base preferably has a first projecting portion coming into contact with the rotating member on a prescribed region of a surface opposed to the rotating member, and the rotating member or the pressing member preferably has a second projecting portion coming into contact with the pressing member or the rotating member on a prescribed region of a surface opposed to the pressing member or the rotating member. According to this structure, the rotating member rotates while coming into contact with the base and the pressing member only on the first and second projecting portions respectively, whereby a range of abrasions of the members resulting from rotational friction can be limited.

In this case, the rotating member is preferably so formed as to rotate in a range capable of bringing the second projecting portion into contact with the pressing member or the rotating member when rotating in the horizontal plane. According to this structure, the rotating member, receiving pressing force from the pressing member through the second projecting portion regardless of the rotational angle, can regularly attain stable rotation.

In the aforementioned structure further comprising the pressing member of metal for pressing the rotating member rotatably with respect to the base, the pressing member is preferably formed by a first surface pressing the rotating member and a second surface connected to the first surface and provided with a protrusion on the forward end thereof to have a substantially L-shaped longitudinal section, and the base preferably further has an angular hole receiving the protrusion of the pressing member and serving as a supporting point vertically rotatably supporting the pressing member. According to this structure, the first surface of the pressing member is vertically rotated about the protrusion inserted into the angular hole of the base when the stop member is inserted into the upright portion of the base for bringing the pressing member into contact with the rotating member, whereby the pressing member can be easily brought into contact with the rotating member through the second projecting portion without jolting.

The aforementioned display screen turning apparatus according to the first aspect preferably further comprises a plate member of metal, having a larger plane area than the platelike spring, inserted into the upright portion of the base and arranged between the platelike spring and the stop member. According to this structure, the pressing force of the platelike spring acts on the stop member through the plate member of metal having a larger plane area (installation area) than the platelike spring, whereby the stop member can receive the pressing force from the platelike spring on the overall contact surface coming into contact with the plate member. Thus, the stop member can stably hold the platelike spring.

In the aforementioned display screen turning apparatus according to the first aspect, the stop member is preferably in the form of a plate, and preferably receives the pressing force of the platelike spring on an end surface portion perpendicular to the thickness direction. According to this structure, the pressing force of the platelike spring can be received by the strong end surface portion of the stop member in the direction perpendicular to the thickness direction, whereby the stop member can be inhibited from deformation resulting from the pressing force of the platelike spring.

In this case, the end surface portion of the stop member is preferably tapered along the longitudinal direction where the stop member extends in a platelike manner. According to this structure, the sectional height of the stop member received in the hole changes along the tapered shape of the end surface portion when the stop member is inserted into the hole of the upright portion of the base, whereby the pressing force for deflecting the platelike spring can be varied with the insertion margin. Thus, the operator can produce desired pressing force on the pressing member by inserting the stop member into the hole of the upright portion by a prescribed insertion margin, whereby the assembling workability for the display screen turning apparatus can be improved as compared with a case of controlling torque in fastening with bolts/nuts.

A display screen turning apparatus according to a second aspect of the present invention comprises a rotating member mounted with a display screen and rotatable in a horizontal plane, a base, rotatably holding the rotating member, provided with an upright portion having a hole, a platelike spring of metal fitted onto the upright portion of the base for pressing the rotating member, a stop member inserted into the hole of the upright portion of the base for pressing the platelike spring and holding the platelike spring in a deflected state, a pressing member of metal for pressing the rotating member rotatably with respect to the base and a plate member of metal, having a larger plane area than the platelike spring, inserted into the upright portion of the base and arranged between the platelike spring and the stop member, while the base is made of sheet metal, the upright portion of the base is formed integrally with the base by partially uprighting the base, the base has a first projecting portion coming into contact with the rotating member on a prescribed region of a surface opposed to the rotating member, the rotating member or the pressing member has a second projecting portion coming into contact with the pressing member or the rotating member on a prescribed region of a surface opposed to the pressing member or the rotating member, and the stop member is in the form of a plate and receives the pressing force of the platelike spring on an end surface portion perpendicular to the thickness direction.

According to the second aspect of the present invention, as hereinabove described, the display screen turning apparatus comprises the stop member inserted into the hole of the upright portion of the base for pressing the platelike spring and holding the platelike spring in a deflected state, whereby assembling workability can be improved through a simple operation of deflecting the platelike spring with a jig or the like to produce prescribed pressing force and inserting the stop member into the hole of the upright portion of the base. Further, the display screen turning apparatus comprises the platelike spring of metal fitted onto the upright portion of the base rotatably holding the rotating member to press the rotating member, whereby the rotating member regularly rotates in the state pressed by the platelike spring with the prescribed pressing force, and can be inhibited from jolting during rotation. Further, the upright portion of the base is so integrally formed on the base that no operation is required for mounting an upright portion manufactured as an individual component on the base, whereby the assembling workability can be further improved. In addition, the base is made of sheet metal and the upright portion of the base is formed integrally with the base by partially uprighting the base, whereby the upright portion can be easily formed at the same time when the base of sheet metal is formed by press working.

In the display screen turning apparatus according to the second embodiment, further, the base has the first projecting portion coming into contact with the rotating member on the prescribed region of the surface opposed to the rotating member and the rotating member or the pressing member has the second projecting portion coming into contact with the pressing member or the rotating member on the prescribed region of the surface opposed to the pressing member or the rotating member so that the rotating member rotates while coming into contact with the base and the pressing member only on the first and second projecting portions respectively, whereby a range of abrasions of the members resulting from rotational friction can be limited. The display screen turning apparatus further comprises the plate member of metal, having a larger plane area than the platelike spring, inserted into the upright portion of the base and arranged between the platelike spring and the stop member so that the pressing force of the platelike spring acts on the stop member through the plate member of metal having a larger plane area (installation area) than the platelike spring, whereby the stop member can receive the pressing force from the platelike spring on the overall contact surface coming into contact with the plate member. Thus, the stop member can stably hold the platelike spring. The stop member is in the form of a plate and receives the pressing force of the platelike spring on the end surface portion perpendicular to the thickness direction so that the pressing force of the platelike spring can be received by the strong end surface portion of the stop member in the direction perpendicular to the thickness direction, whereby the stop member can be inhibited from deformation resulting from the pressing force of the platelike spring.

In the aforementioned display screen turning apparatus according to the second aspect, the rotating member preferably includes a first side end surface portion arcuate in plan view while the upright portion of the base preferably includes a first upright portion provided on the rotation center of the rotating member and a second upright portion provided at a prescribed distance from the first upright portion, the second upright portion of the base preferably has a second side end surface portion, and the first side end surface portion of the rotating member preferably substantially comes into contact with the second side end surface portion of the second upright portion when the rotating member rotates in the horizontal plane, so that horizontal movement of the rotating member can be regulated. According to this structure, the rotating member can be inhibited from rotating in a state where the axis of rotation is horizontally decentered when rotating on the upper surface of the base.

In the aforementioned display screen turning apparatus according to the second aspect, the upright portion of the base preferably includes a first upright portion provided on the rotation center of the rotating member and second upright portions provided at a prescribed distance from the first upright portion, and the second upright portions of the base are preferably substantially symmetrically provided on both sides of the rotating member with respect to the first upright portion in plan view. According to this structure, the rotating member is rotatably held by the platelike spring and the stop member in the vicinity of the second upright portions of the base provided on both sides of the rotating member at substantially symmetrical distances from the rotation center, whereby the rotational torque of the rotating member can be inhibited from dispersion resulting from the rotational direction.

In the aforementioned display screen turning apparatus according to the second aspect, the platelike spring is preferably an annularly formed disc spring. According to this structure, the pressing force for deflecting the disc spring by the stop member can uniformly act in the form of a circle having a constant radius along the upright portion of the base.

In the aforementioned display screen turning apparatus according to the second aspect, the rotating member is preferably so formed as to rotate in a range capable of bringing the second projecting portion into contact with the pressing member or the rotating member when rotating in the horizontal plane. According to this structure, the rotating member, receiving pressing force from the pressing member through the second projecting portion regardless of the rotational angle, can regularly attain stable rotation.

In the aforementioned display screen turning apparatus according to the second aspect, the pressing member is preferably formed by a first surface pressing the rotating member and a second surface connected to the first surface and provided with a protrusion on the forward end thereof to have a substantially L-shaped longitudinal section, and the base preferably further has an angular hole receiving the protrusion of the pressing member and serving as a supporting point vertically rotatably supporting the pressing member. According to this structure, the first surface of the pressing member is vertically rotated about the protrusion inserted into the angular hole of the base when the stop member is inserted into the upright portion of the base for bringing the pressing member into contact with the rotating member, whereby the pressing member can be easily brought into contact with the rotating member through the second projecting portion without jolting.

In the aforementioned display screen turning apparatus according to the second aspect, the end surface portion of the stop member is preferably tapered along the longitudinal direction where the stop member extends in a platelike manner. According to this structure, the sectional height of the stop member received in the hole changes along the tapered shape of the end surface portion when the stop member is inserted into the hole of the upright portion of the base, whereby the pressing force for deflecting the platelike spring can be varied with the insertion margin. Thus, the operator can produce desired pressing force on the pressing member by inserting the stop member into the hole of the upright portion by a prescribed insertion margin, whereby the assembling workability for the display screen turning apparatus can be improved as compared with a case of controlling torque in fastening with bolts/nuts.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention is now described with reference to the drawings.

The structure of a display screen turning apparatus 10 according to the embodiment of the present invention is described with reference to FIGS. 1 to 13.

Figure 1:
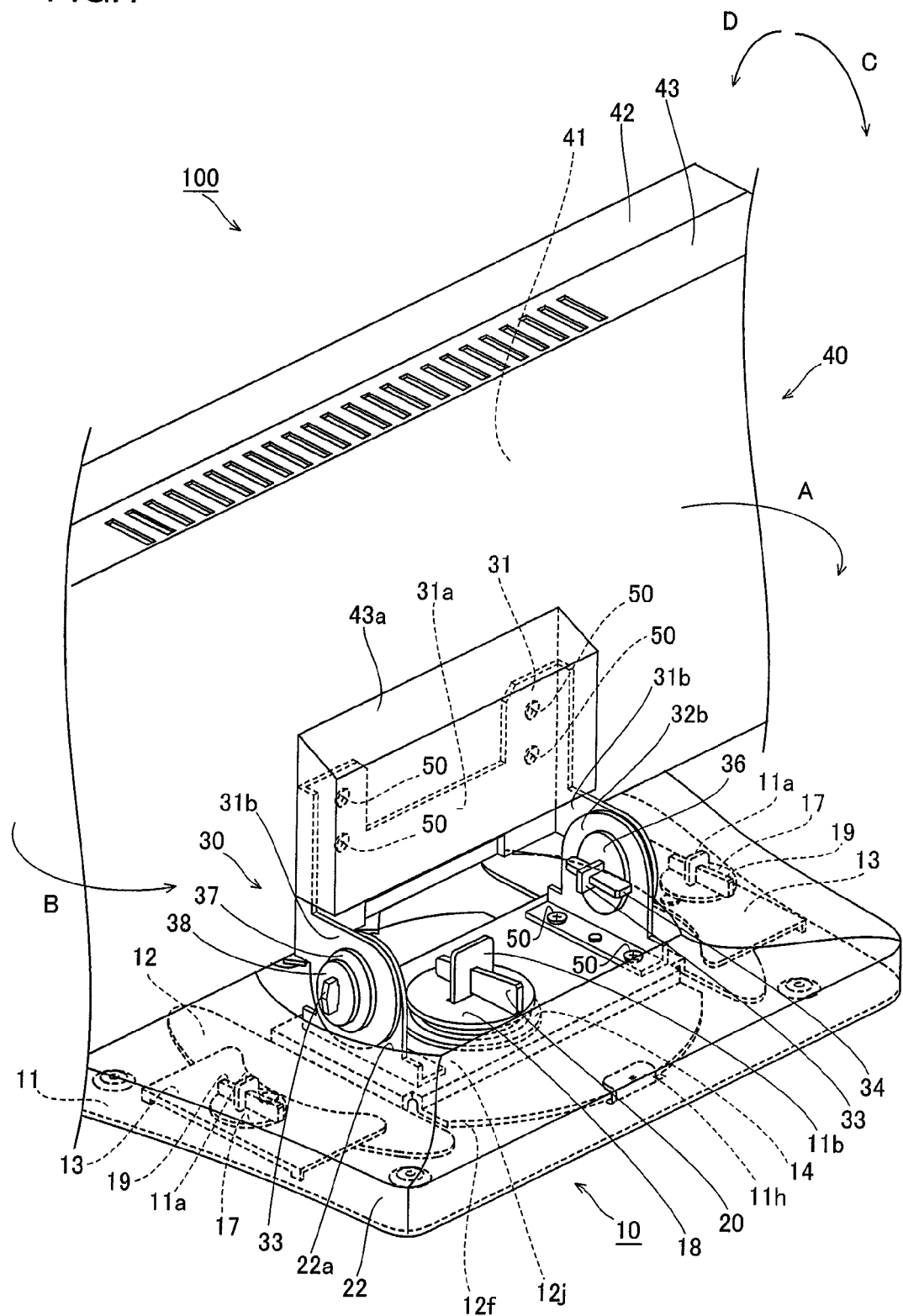
FIG. 1 is a perspective view showing the overall structure of a liquid crystal display provided with a display screen turning apparatus according to an embodiment of the present invention.
Figure 2:
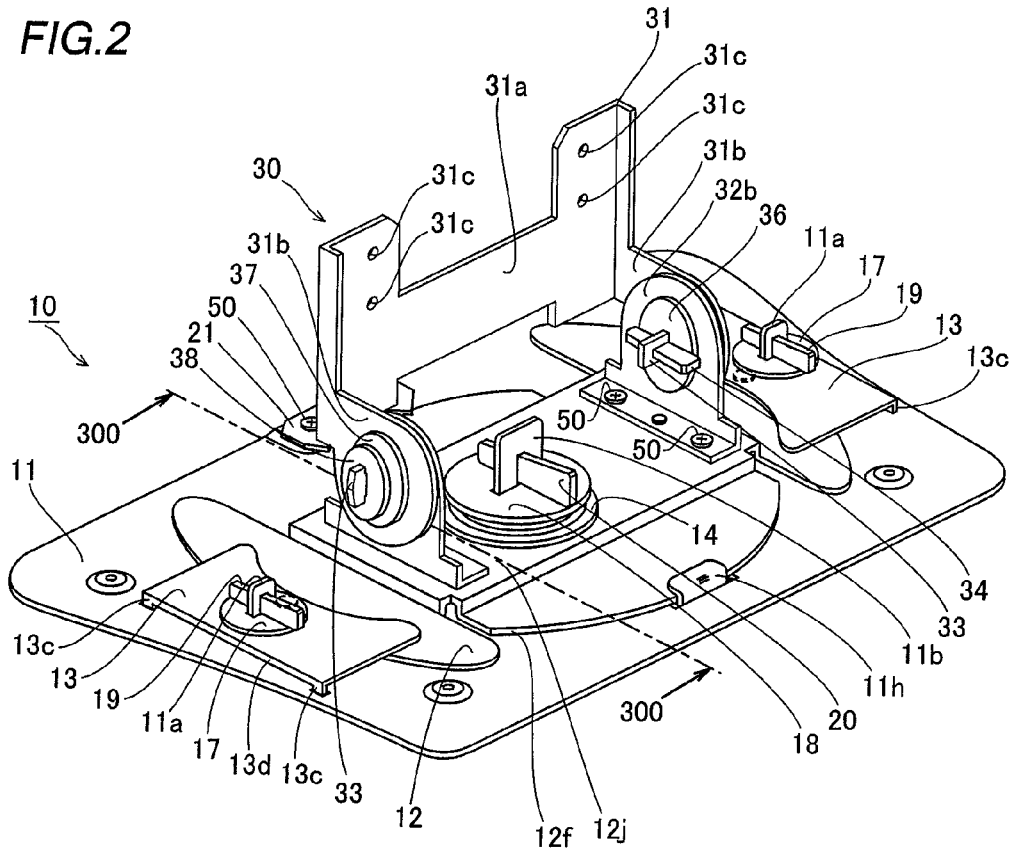
FIG. 2 is a perspective view showing a state removing a display screen portion from the liquid crystal display according to the embodiment shown in FIG. 1.

As shown in FIG. 1, the display screen turning apparatus 10 according to the embodiment of the present invention is so provided as to rotate a display screen portion 40 of a liquid crystal display 100 supported by a display screen support mechanism 30 in the horizontal direction (along arrows A and B) (by about ±45°, for example). The display screen support mechanism 30 is fixed to the upper surface of a rotating member 12, described later, provided on the display screen turning apparatus 10 with screw members 50 as shown in FIG. 2, for rendering the display screen portion 40 rotatable in the vertical direction (along arrows C and D) with respect to the display screen turning apparatus 10 while supporting the display screen portion 40 in a state inclined by a prescribed angle with respect to the display screen turning apparatus 10, as shown in FIG. 1.

Figure 3:
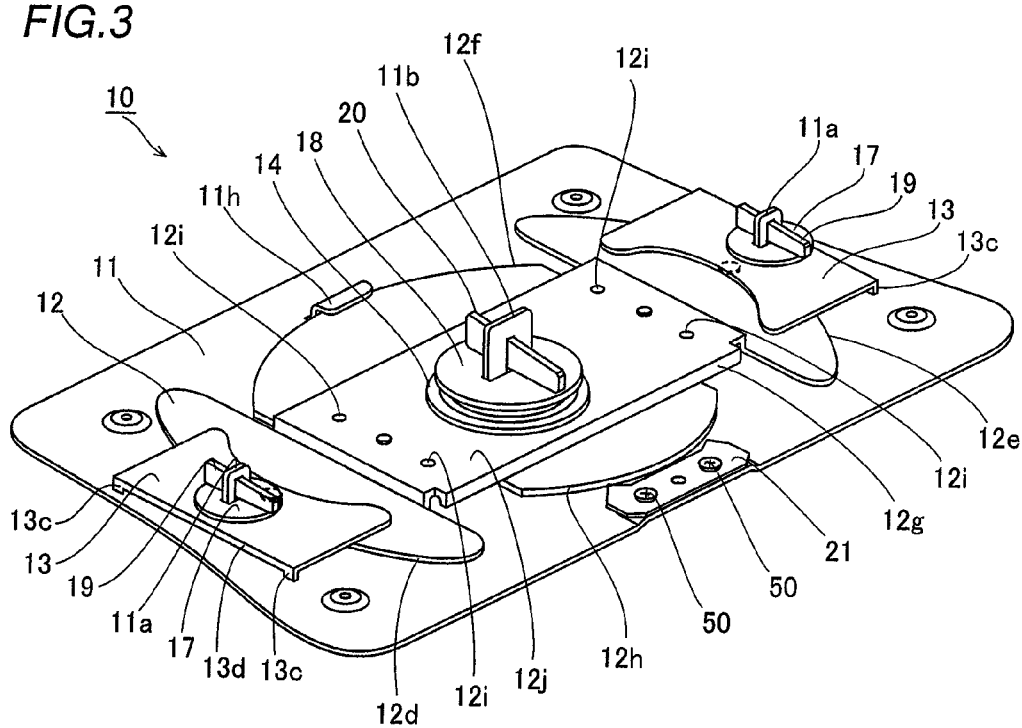
FIG. 3 is a perspective view of the display screen turning apparatus showing a state removing the display screen portion and a display screen support mechanism from the liquid crystal display according to the embodiment shown in FIG. 1.

According to this embodiment, the display screen turning apparatus 10 is constituted of a base 11 of sheet metal, the rotating member 12 of sheet metal, pressing members 13 and 14 of metal, circular disc springs 15 and 16 of metal, circular plate members 17 and 18 of metal and stop members 19 and 20 of sheet metal, as shown in FIG. 3. The disc springs 15 and 16 are examples of the "platelike spring" in the present invention.

Figure 4:
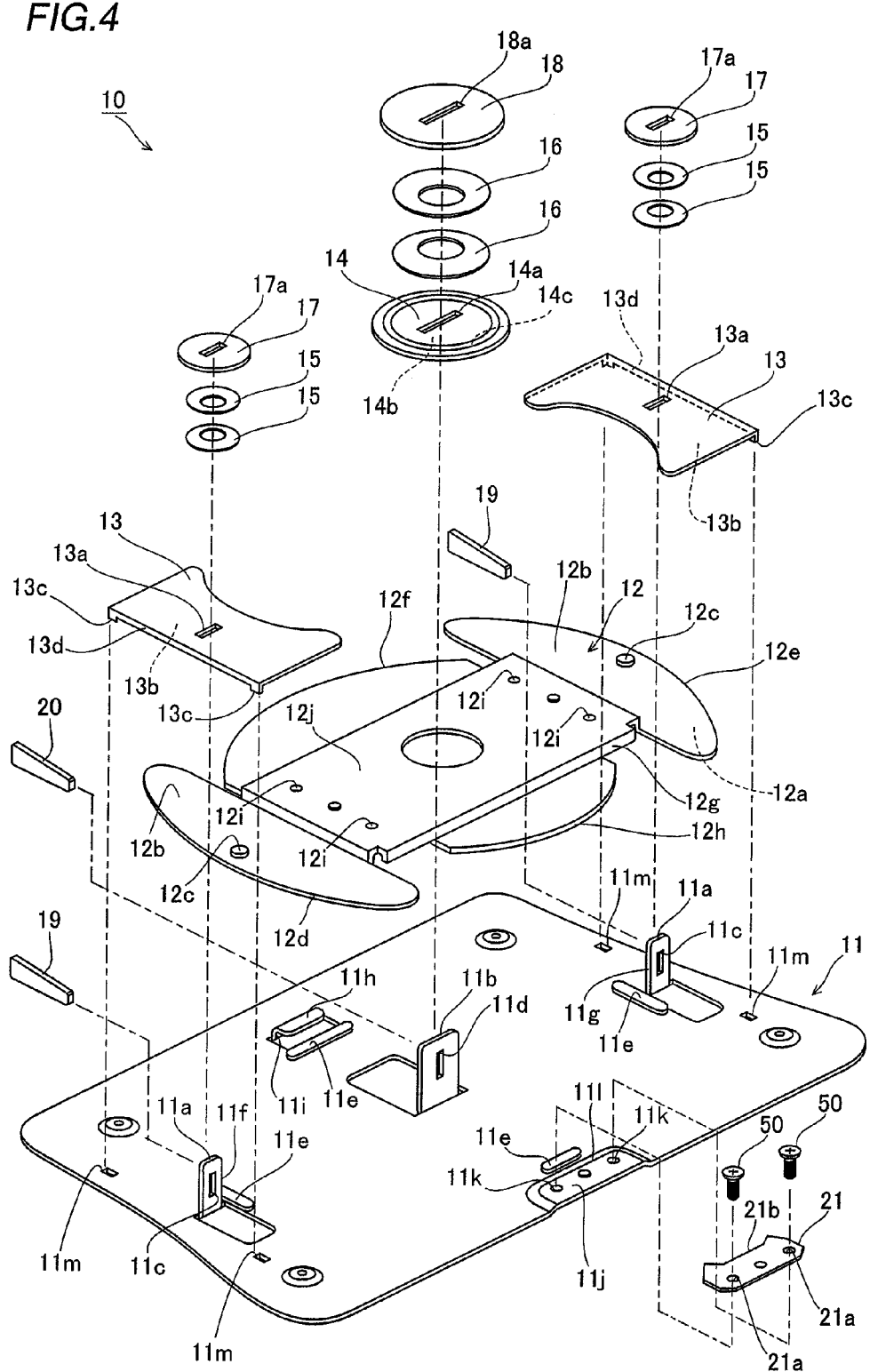
FIG. 4 is an exploded perspective view showing the structure of the display screen turning apparatus according to the embodiment shown in FIG. 1.

According to this embodiment, further, the rotating member 12 is placed on a prescribed position of the base 11 of sheet metal while the pressing members 13 and 14 are fitted onto upright portions 11a and 11b integrally formed on the base 11 by partially uprighting the same through rectangular holes 13a and 14a provided in the pressing members 13 and 14 of metal respectively, as shown in FIGS. 3 and 4. Pairs of disc springs 15 and 16 are so superposed that the convex sides thereof face each other, and fitted onto the pressing members 13 and 14 respectively. As shown in FIGS. 3 and 4, further, the plate members 17 and 18 of metal are fitted onto the pairs of disc springs 15 and 16 through rectangular holes 17a and 18a provided therein respectively, while the stop members 19 and 20 are inserted into rectangular holes 11c and 11d provided in the upright portions 11a and 11b respectively. Thus, the pairs of disc springs 15 and 16 are pressed and deflected with prescribed pressing force, thereby horizontally rotatably holding the rotating member 12 sandwiched between the base 11 and the pressing members 13 and 14. The upright portions 11a and 11b are examples of the "first upright portion" and the "second upright portion" in the present invention respectively.

According to this embodiment, the circular plate members 17 and 18 have plane areas larger than those of the pairs of circular disc springs 15 and 16 respectively, as shown in FIGS. 3 and 4. The stop members 19 and 20 are inserted into the holes 11c and 11d (see FIG. 4) of the upright portions 11a and 11b (see FIG. 3) respectively, for receiving the pressing force of the pairs of disc springs 15 and 16 on end surface portions 19a, 19b, 20a and 20b in a direction H perpendicular to the thickness direction T, as shown in FIG. 5.

Figure 5:
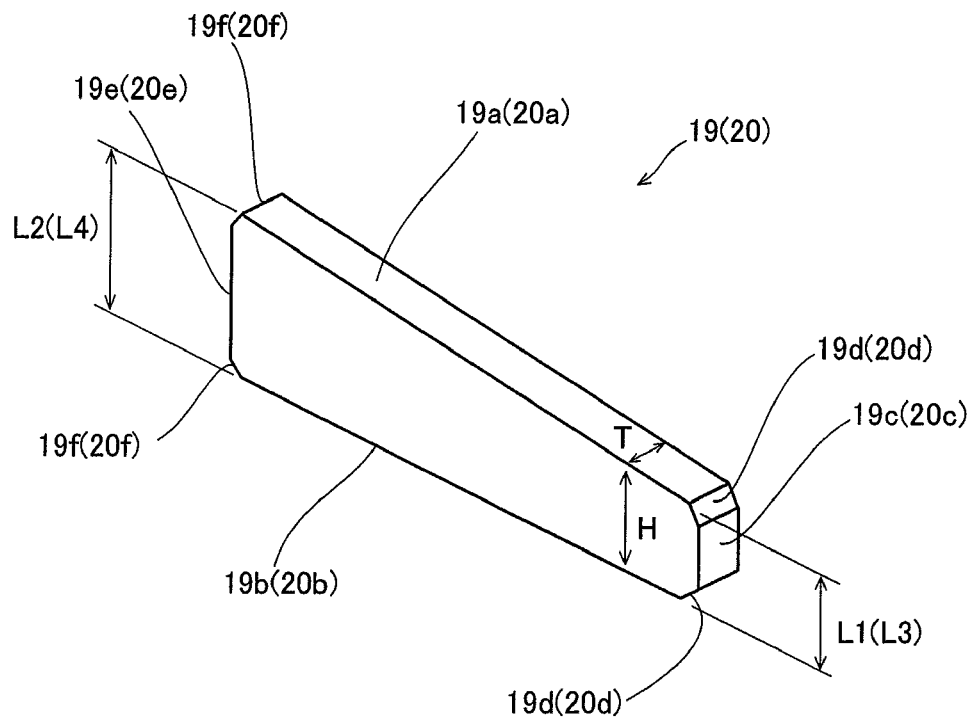
FIG. 5 illustrates a stop member of the display screen turning apparatus according to the embodiment shown in FIG. 1.

According to this embodiment, the stop members 19 and 20 of sheet metal are formed in a wedged (tapered) manner, and include chamfers 19d and 20d provided on first side surfaces 19c and 20c extending in the longitudinal direction respectively and chamfers 19f and 20f provided on second side surfaces 19e and 20e extending in the longitudinal direction respectively, as shown in FIG. 5. The lengths L1 and L3 of the first side surfaces 19c and 20c of the stop members 19 and 20 are smaller than the lengths L2 and L4 of the second side surfaces 19e and 20e respectively. Thus, the stop members 19 and 20 formed in the wedged (tapered) manner can be easily inhibited from slipping off when inserted into the holes 11c and 11d provided in the upright portions 11a and 11b of the base 11 respectively, as shown in FIG. 3. The chamfers 19d and 20d are so provided that the stop members 19 and 20 can be easily inserted into the holes 11c and 11d (see FIG. 4) respectively.

Figure 7:
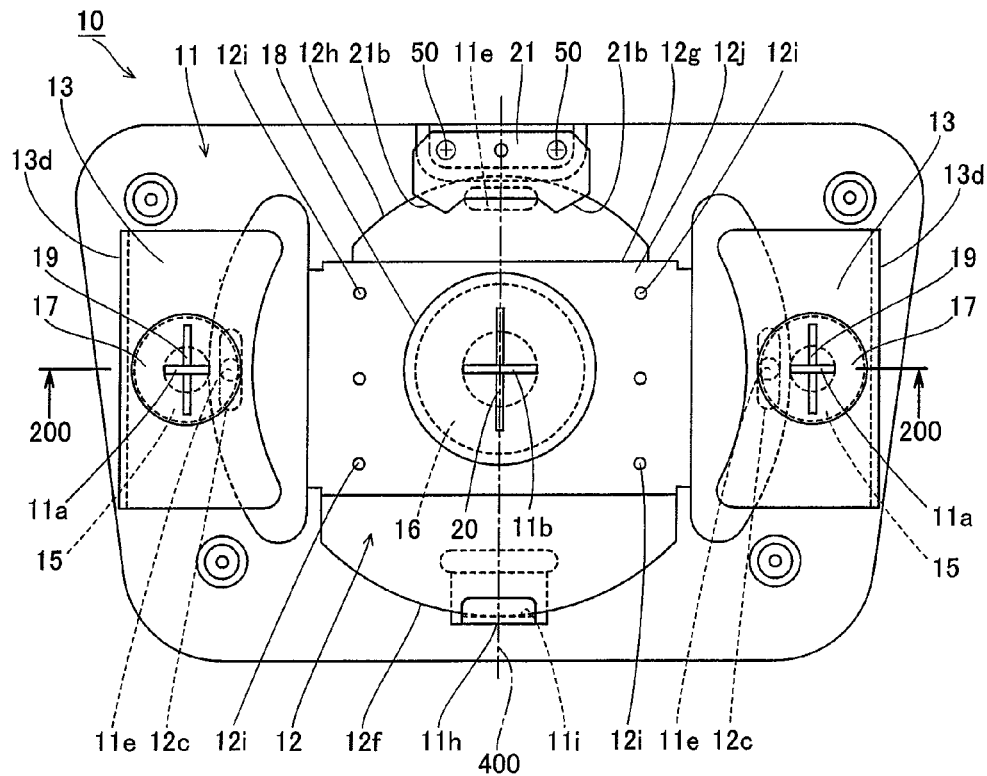
FIG. 7 is a plan view of the display screen turning apparatus according to the embodiment shown in FIG. 1.
Figure 8:
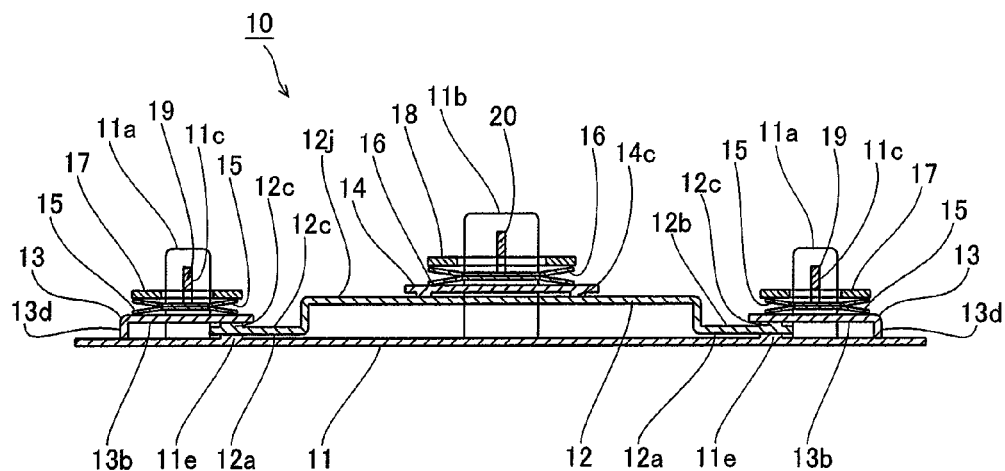
FIG. 8 is a sectional view taken along the line 200-200 in FIG. 7.

According to this embodiment, projecting portions 11e coming into contact with the lower surface 12a of the rotating member 12 are provided by press working on prescribed regions (four portions) of the base 11 opposed to the rotating member 12, as shown in FIGS. 4, 7 and 8. Further, projecting portions 12c coming into contact with pressing surfaces 13b of the pressing members 13 are provided by press working on prescribed regions (two portions) of the upper surface 12b of the rotating member 12 opposed to the pressing members 13. The projecting portions 11e are in the form of ribs extending tangentially along the rotational direction of the rotating member 12, while the projecting portions 12c are in the form of circular bosses. The projecting portions 11e and 12c are examples of the "first projecting portion" and the "second projecting portion" in the present invention respectively.

Figure 6:
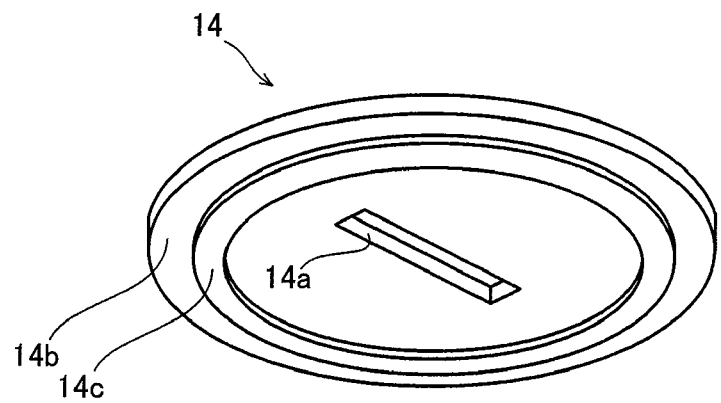
FIG. 6 illustrates a plate member of the display screen turning apparatus according to the embodiment shown in FIG. 1.

According to this embodiment, a circular rib 14c coming into contact with the rotating member 12 is provided by press working on a prescribed region of the lower surface 14b of the pressing member 14 opposed to the rotating member 12, as shown in FIGS. 4, 6 and 8.

According to this embodiment, the upright portions 11a of the base 11 include side surface portions 11f and 11g for smoothly guiding rotation (horizontal turning) of the rotating member 12 by substantially coming into contact with arcuate side surface portions 12d and 12e formed on the rotating member 12 respectively in rotation of the rotating member 12, as shown in FIGS. 4 and 7. The side surface portions 12d and 12e are examples of the "first side end surface portion" in the present invention, and the side surface portions 11f and 11g are examples of the "second side end surface portion" in the present invention.

According to this embodiment, the upright portions 11a of the base 11 are provided on positions at substantially symmetrical distances from a centerline 400 (shown by a one-dot chain line) with respect to the upright portion 11b provided on the rotation center of the rotating member 12, as shown in FIG. 7. The base 11 has a pawl portion 11h integrally formed thereon by uprighting (press working) as shown in FIG. 4, so that an inner wall surface 11i of the pawl portion 11h guides rotation of an arcuate side surface portion 12f formed on the rotating member 12 during rotation of the rotating member 12. The base 11 further has two screw receiving holes 11k in a projecting portion 11j provided by press working, so that a plate member 21 of metal having holes 21a is fixed onto the projecting portion 11j of the base 11 with the screw members 50. A side surface portion 21b of the plate member 21 of metal is so formed as to come into contact with a side surface portion 12g of the rotating member 12 when the rotating member 12 horizontally rotates by a prescribed angle (about ±45° in this embodiment), so that the rotation can be regulated. Thus, the rotating member 12 rotates in a horizontal plane within a rotational range (corresponding to about ±45° in this embodiment) for keeping the projecting portions 12c in contact with the pressing surfaces 13b of the pressing members 13. The projecting portion 11j of the base 11 includes an inclined surface 11l, so that an arcuate side surface portion 12h formed on the rotating member 12 comes into contact with the inclined surface 11l during the rotation of the rotating member 12.

According to this embodiment, the pressing members 13 are formed by the pressing surfaces 13b pressing the rotating member 12 and leg surfaces 13d connected to the pressing surfaces 13b and provided with pairs of projecting portions 13c (see FIG. 4) on the forward ends thereof respectively to have substantially L-shaped longitudinal cross sections, as shown in FIG. 8. The pressing surfaces 13b and the leg surfaces 13d are examples of the "first surface" and the "second surface" in the present invention respectively. As shown in FIG. 4, the base 11 is provided with pairs of angular holes 11m on four positions opposed to the pressing members 13. When the pressing members 13 are fitted onto the upright portions 11a from above for pressing the rotating member 12 as shown in FIG. 8, the pairs of projecting portions 13c (see FIG. 4) provided on the pressing members 13 are inserted into the angular holes 11m (see FIG. 4) respectively thereby positioning the pressing members 13, which in turn are supported to be vertically rotatable on the upper surface of the base 11 about the angular holes 11m.

The rotating member 12 includes a mounting portion 12j provided with four screw receiving holes 12i for fixing a pair of vertical support members 32 (see FIG. 2) described later with the screw members 50, as shown in FIG. 4.

Figure 9:
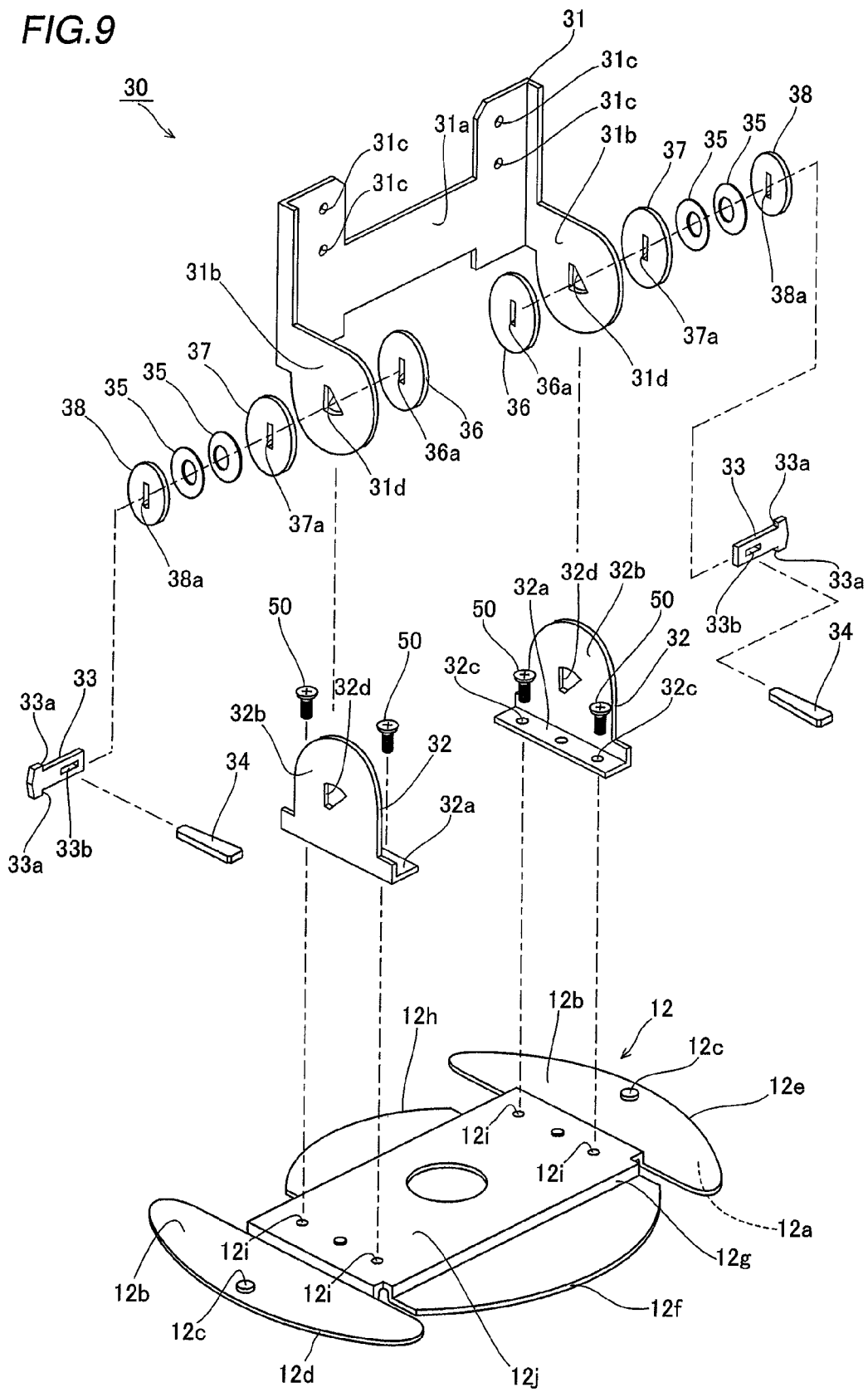
FIG. 9 is an exploded perspective view showing the structure of the display screen support mechanism of the liquid crystal display according to the embodiment shown in FIG. 1.

The display screen support mechanism 30 is constituted of a display screen support member 31, the pair of vertical support members 32, platelike support shafts 33 of sheet metal, stop members 34 of sheet metal, disc springs 35 of metal, pressure-contact plates 36 and 37 of sheet metal and plate members 38 coming into contact with the disk springs 35 of metal, as shown in FIGS. 2 and 9. The pressure-contact plates 36 and 37 are provided with rectangular holes 36a and 37a for receiving the support shafts 33 respectively. The plate members 38 are also provided with rectangular holes 38a for receiving the support shafts 33.

Figure 11:
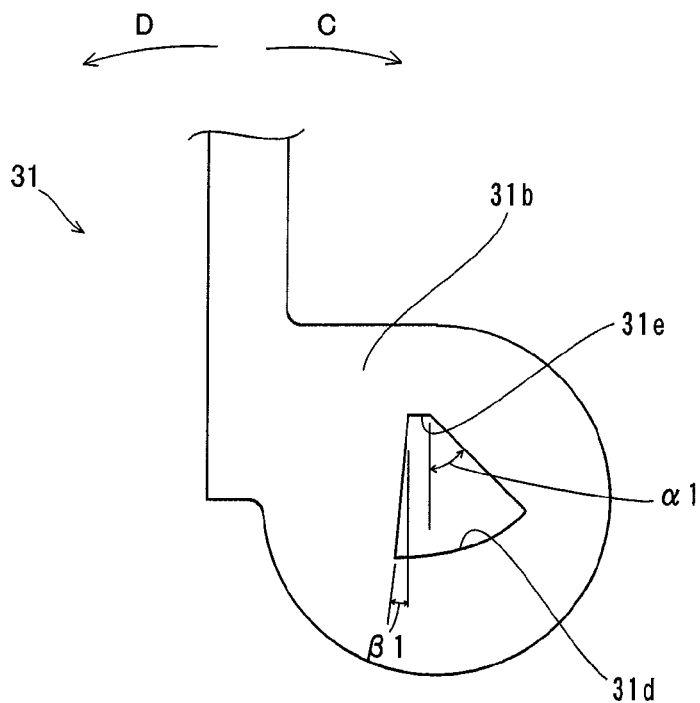
FIG. 11 is a front elevational view of a display screen support member of the display screen support mechanism according to the embodiment shown in FIG. 2.

As shown in FIG. 9, the display screen support member 31 includes a display screen mounting portion 31a and a pair of rotating portions 31b. The display screen mounting portion 31a of the display screen support member 31 is provided with four screw receiving holes 31c. The pair of rotating portions 31b of the display screen support member 31 are so provided as to extend from both side ends of the display screen mounting portion 31a perpendicularly to the surface of the display screen mounting portion 31a respectively. Sectorial holes 31d are provided in the vicinity of the rotation centers of the pair of rotating portions 31b respectively, as shown in FIG. 11.

Figure 10:
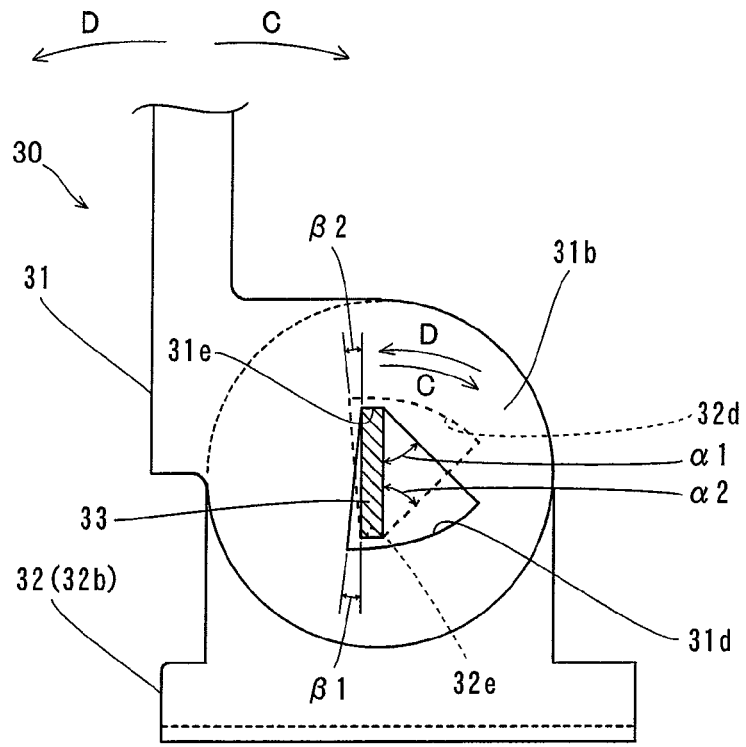
FIG. 10 is a sectional view taken along the line 300-300 in FIG. 2.

The sectorial holes 31d are provided for receiving the platelike support shafts 33, as shown in FIG. 9. Further, the sectorial holes 31d are so arranged as to locate base portions 31e closer to the circle centers upward as shown in FIG. 11, so that the base portions 31e come into contact with the upper surfaces of the support shafts 33. Thus, the base portions 31e of the sectorial holes 31d receive the vertical load of the display screen portion 40 through the display screen support member 31. Further, the sectorial holes 31d have central angles α1 (about 45°) and β1 (about 5°) opening toward different sides from the vertical direction, as shown in FIGS. 10 and 11. The display screen support member 31 is rotatable about the base portions 31e of the sectorial holes 31d supported by the platelike support shafts 33 in a sectorial angular range (α1+β1=about 50° in this embodiment) with respect to the support shafts 33. In other words, the platelike support shafts 33 function as the rotation axes of the display screen support member 31.

Figure 12:
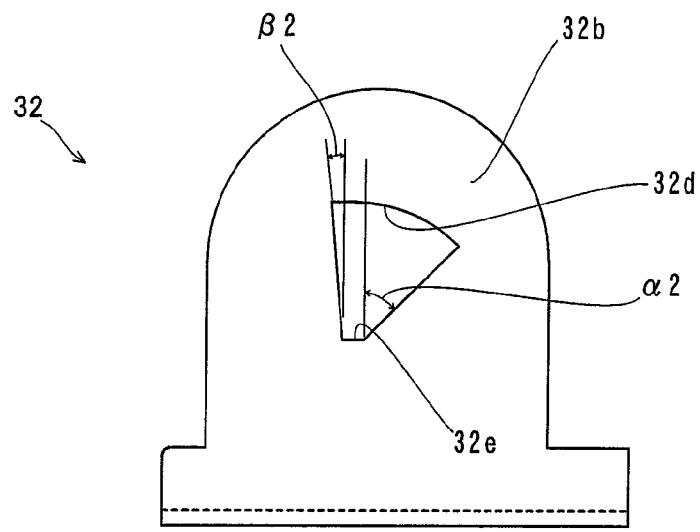
FIG. 12 is a front elevational view of a vertical support member of the display screen support mechanism according to the embodiment shown in FIG. 2.

The pair of vertical support members 32 include base mounting portions 32a and rotating portion mounting portions 32b respectively, as shown in FIGS. 9 and 12. The base mounting portions 32a of the vertical support members 32 are provided with four screw receiving holes 32c. The rotating portion mounting portions 32b of the vertical support members 32 are so provided as to vertically extend upward from first ends of the surfaces of the base mounting portions 32a.

The rotating portion mounting portions 32b of the vertical support members 32 are provided with sectorial holes 32d. The sectorial holes 32d are provided for receiving the platelike support shafts 33, as shown in FIG. 12. Further, the sectorial holes 32d are so arranged as to locate base portions 32e closer to the circle centers downward as shown in FIG. 12, so that the base portions 32e come into contact with the lower surfaces of the support shafts 33. Thus, the base portions 32e of the sectorial holes 32d receive the vertical load of the display screen portion 40 through the display screen support member 31 and the support shafts 33. In other words, the base portions 31e of the holes 31d of the display screen support member 31 and the base portions 32e of the holes 32d of the vertical support members 32 receive the vertical load of the display screen portion 40. according to this embodiment Further, the sectorial holes 32d have central angles α2 (about 45°) and β2 (about 5°) opening toward different sides from the vertical direction, as shown in FIGS. 10 and 12. The support shafts 33 are rotatable about the base portions 32e of the sectorial holes 32d in a sectorial angular range (α2+β2=about 50° in this embodiment) with respect to the support shafts 33.

The platelike support shafts 33 of sheet metal include pairs of contact portions 33a and rectangular holes 33b respectively, as shown in FIG. 9. The pairs of contact portions 33a of the support shafts 33 are so provided as to protrude from rear ends of both side surfaces of the support shafts 33 extending in the longitudinal direction. These contact portions 33a are provided for coming into contact with the plate members 38 closer to the vertical support members 32, as shown in FIGS. 2 and 9. The rectangular holes 33b of the support shafts 33 are provided for receiving the stop members 34, as shown in FIGS. 2 and 9.

Figure 13:
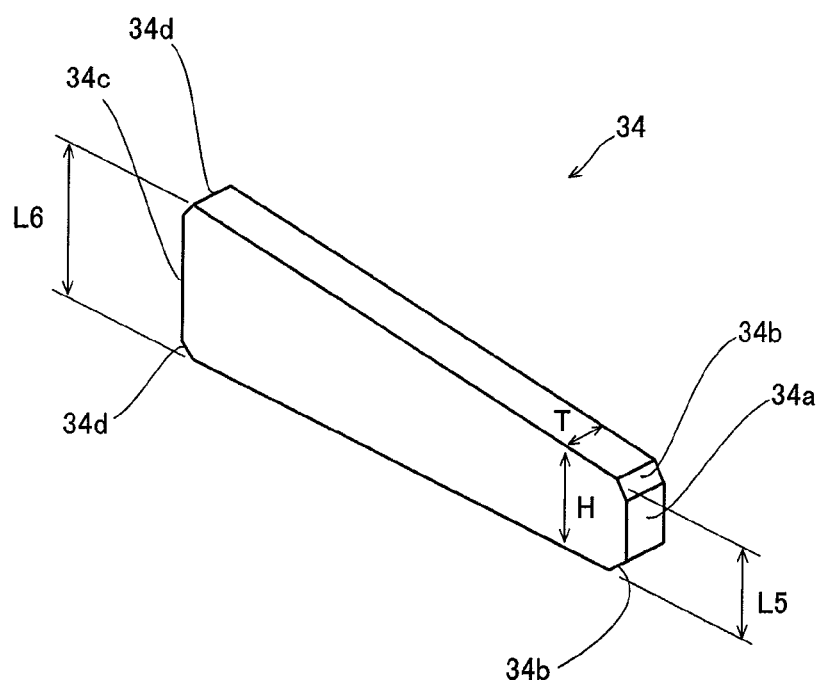
FIG. 13 illustrates the stop member of the display screen support mechanism according to the embodiment shown in FIG. 2.

As shown in FIG. 13, the stop members 34 of sheet metal are formed in a wedged (tapered) manner, and include chamfers 34b provided on first side surfaces 34a extending in the longitudinal direction and chamfers 34d provided on second side surfaces 34c extending in the longitudinal direction. The length L5 of the first side surfaces 34a of the stop members 34 is smaller than the length L6 of the second side surfaces 34c. Thus, the stop members 34 formed in the wedged manner can be easily inhibited from slipping off when inserted into the rectangular holes 33b (see FIG. 9) provided in the platelike support shafts 33, as shown in FIG. 2. The chamfers 34b are so provided that the stop members 34 can be easily inserted into the rectangular holes 33b (see FIG. 9) provided in the support shafts 33.

The display screen portion 40 of the liquid crystal display 100 is so formed that a liquid crystal module 41 including a liquid crystal screen (not shown) is enclosed with front and rear cabinets 42 and 43 of resin, as shown in FIG. 1. The liquid crystal module 41 of the display screen portion 40 is mounted on the display screen support member 31 by fastening the screw members 50 to screw mounting holes (not shown)

through the screw receiving holes 31c of the display screen support member 31. The rear cabinet 43 is provided with a notch 43a for arranging the display screen support member 31 in a concealed manner.

A cover member 22 of resin is mounted on the base 11 of the display screen turning apparatus 10, as shown in FIG. 1. The cover member 22 of resin is provided with a notch 22a for rotatably arranging the display screen support mechanism 30.

Rotation of the display screen turning apparatus 10 and the display screen support mechanism 30 according to this embodiment is now described with reference to FIGS. 1, 3, 4, 9, 10 and 14 to 20.

Figure 14:
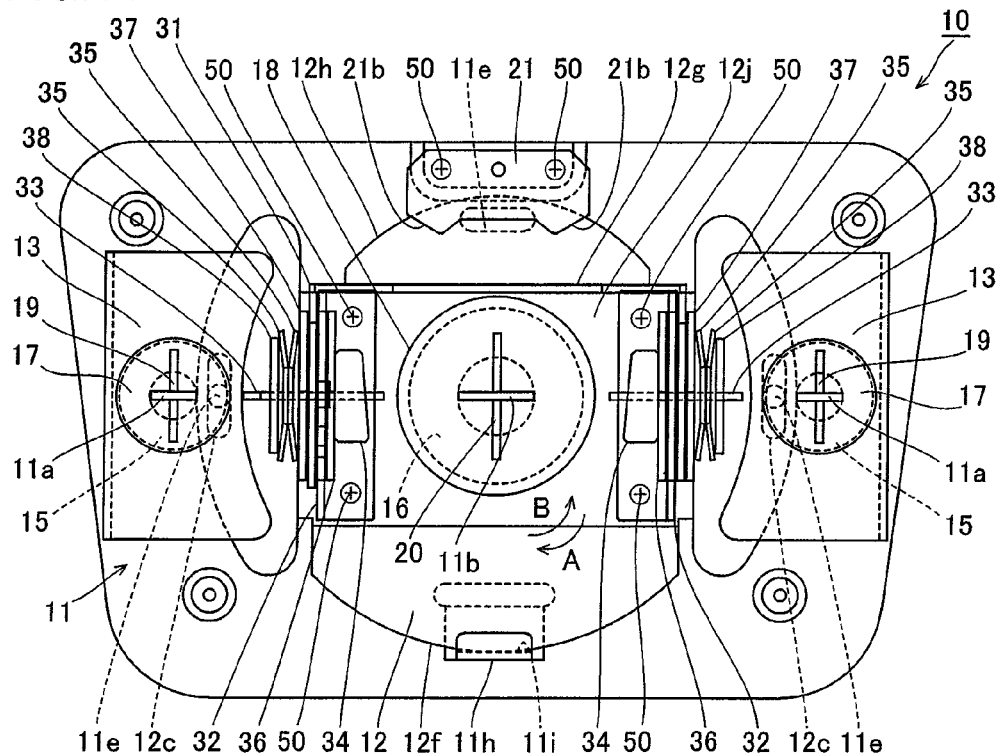
FIGS. 14 and 15 are plan views for illustrating rotation of the display screen turning apparatus according to the embodiment shown in FIG. 2.
Figure 15:
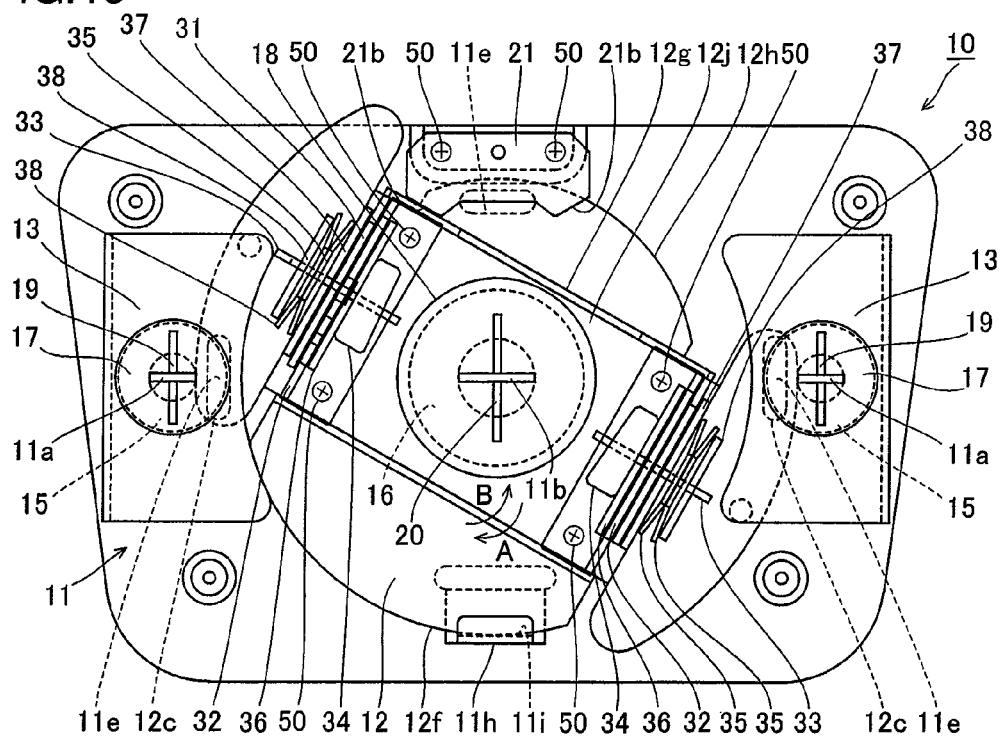

In order to horizontally rotate the display screen turning apparatus 10, the user grips the display screen portion 40 (see FIG. 1) supported by the display screen support member 31 in a state directed frontward (where the longer sides of the base 11 and the display screen portion 40 shown in FIG. 1 are parallel to each other) as shown in FIG. 14, and presses the same along arrow A (see FIG. 1). In this case, the four arcuate side surface portions 12d, 12e, 12f and 12h of the rotating member 12 arranged on the upper surface of the base 11 are so guided by the side surface portions 11f and 11g of the upright portions 11a of the base 11, the pawl portion 11h and the inclined surface 11l of the projecting portion 11j that the rotating member 12 horizontally rotates along arrow A, as shown in FIG. 14. The rotating member 12 is rotatable up to a rotational angle (about 45° in this embodiment) at which the side surface portion 12g thereof comes into contact with the side surface portion 21b of the plate member 21 of the base 11, as shown in FIG. 15. In order to rotate the display screen portion 40 along arrow B (see FIG. 1) from the state where the display screen support member 31 is directed frontward as shown in FIG. 14, the user performs an operation similar to the above.

When the user stops pressing the display screen portion 40 at an arbitrary rotational angle of the rotating member 12 in the range of 0° to about 45° along arrow A or B with reference to the display screen support member 31 directed frontward, the rotation of the rotating member 12 is stopped on this position by frictional force between the pressing members 13 and 14 and the rotating member 12, due to the disc springs 15 and 16 (see FIG. 4) pressing the pressing members 13 and 14 (see FIG. 4) respectively as described above.

Figure 16:
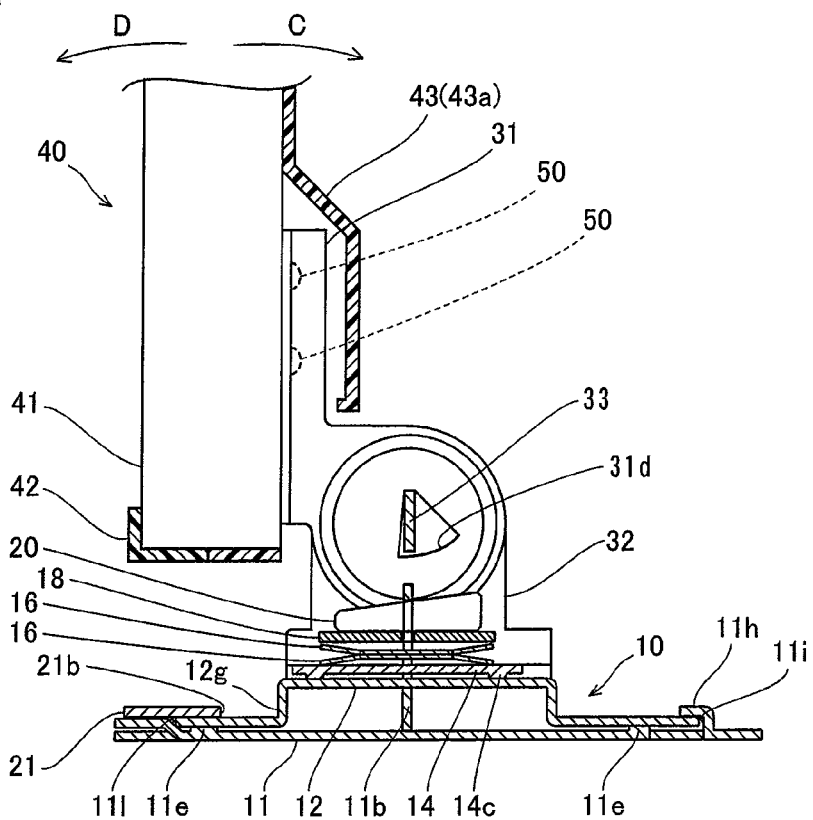
FIGS. 16 to 20 are sectional views for illustrating rotation of the display screen support mechanism according to the embodiment shown in FIG. 2.
Figure 17:
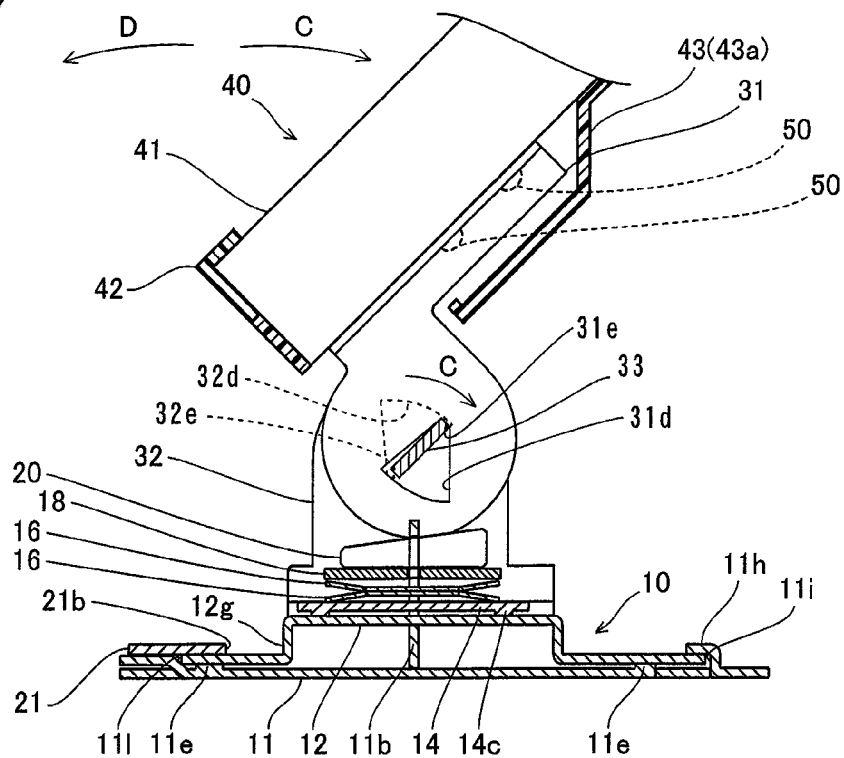
Figure 18:
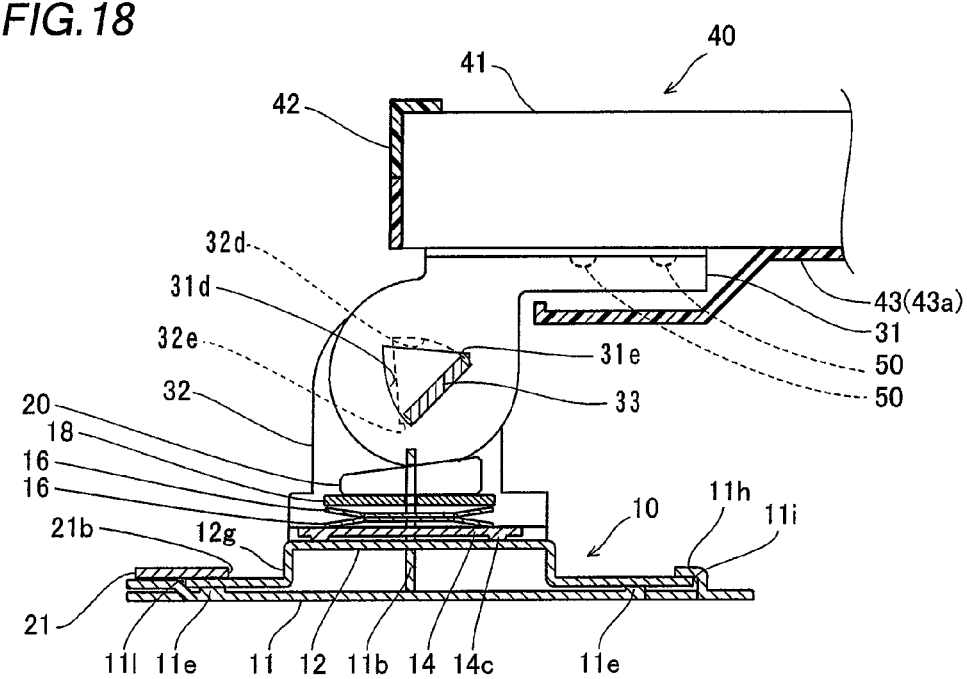

In order to vertically rotate the display screen support mechanism 30, the user presses the display screen portion 40 supported by the display screen support member 31 in the state supported perpendicularly to the display screen turning apparatus 10 as shown in FIG. 16 along arrow C. In this case, the base portions 31e of the sectorial holes 31d of the display screen support member 31 come into contact with the upper surfaces of the support shafts 33, so that the display screen support member 31 and the support shafts 33 integrally start rotating along arrow C about the base portions 32e of the sectorial holes 32d of the vertical support members 32, as shown in FIG. 10. When the display screen support member 31 and the support shafts 33 rotate by about 45° (angle α2 shown in FIG. 10), the side surfaces of the support shafts 33 come into contact with first edges of the sectorial holes 32d of the vertical support members 32, as shown in FIG. 17. When the user further presses the display screen portion 40 along arrow C in this state, the display screen support member 31 continuously rotates about the base portions 31e of the sectoral holes 31d along arrow C with respect to the support shafts 33, as shown in FIG. 17. When the display screen support member 31 further rotates by about 45° (angle α1 shown in FIG. 10) along arrow C, the support shafts 33 come into contact with first edges of the sectorial holes 31d of the display screen support member 31 and stop rotating along arrow C, as shown in FIG. 18. Thus, according to this embodiment, the display screen portion 40 is rotatable from the state supported by the display screen support member 31 perpendicularly to the display screen turning apparatus 10 as shown in FIG. 16 by about 90° along arrow C, as shown in FIG. 18.

Figure 19:
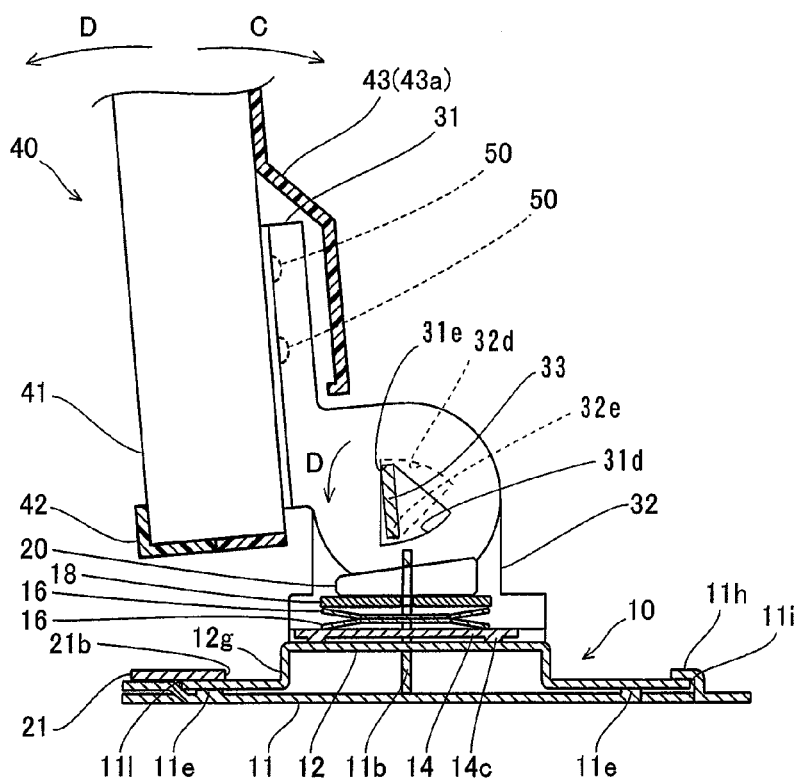
Figure 20:
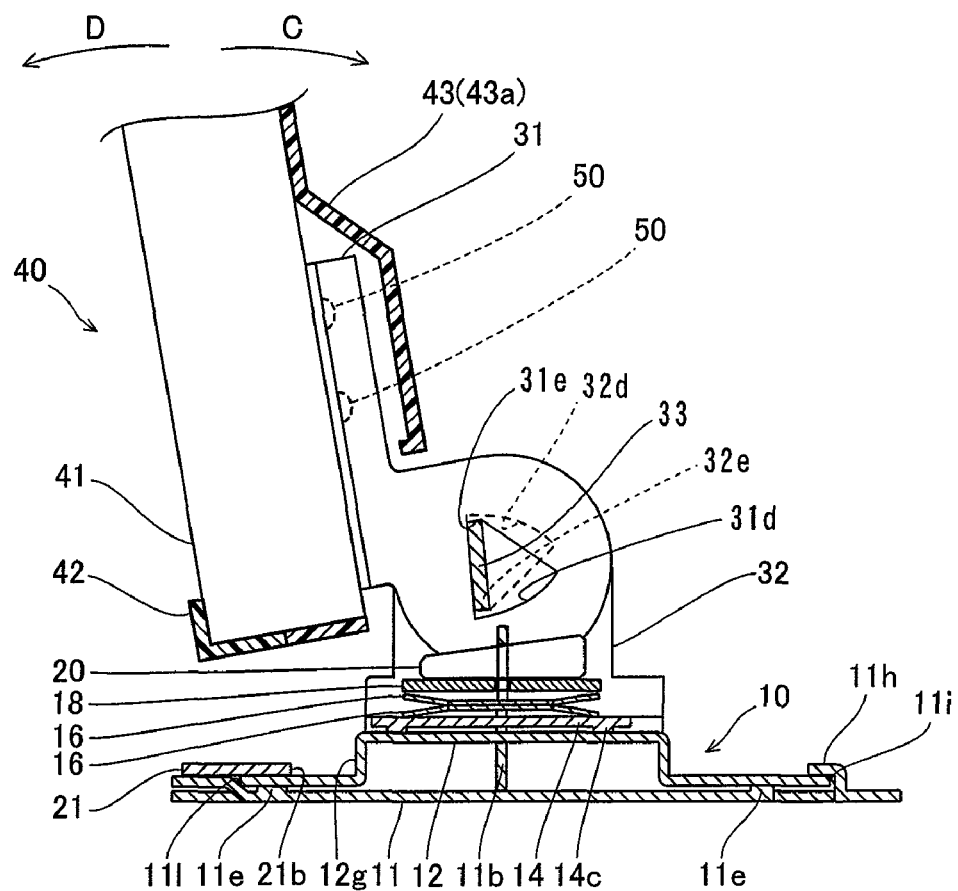

The user presses the display screen portion 40 supported by the display screen support member 31 perpendicularly to the display screen turning apparatus 10 as shown in FIG. 16 along arrow D. In this case, the base portions 31e of the sectorial holes 31d of the display screen support member 31 come into contact with the upper surfaces of the support shafts 33, so that the display screen support member 31 and the support shafts 33 integrally start rotating along arrow D about the base portions 32e of the sectorial holes 32d of the vertical support members 32, as shown in FIG. 10. When the display screen support member 31 and the support shafts 33 rotate by about 5° (angle β2 in FIG. 10), the support shafts 33 come into contact with second edges of the sectorial holes 32d of the vertical support members 32, as shown in FIG. 19. When the user further presses the display screen portion 40 along arrow D in this state, the display screen support member 31 continuously rotates about the base portions 31e of the sectorial holes 31d along arrow D with respect to the support shafts 33, as shown in FIG. 19. When the display screen support member 31 further rotates by about 5° (angle β1 shown in FIG. 10) along arrow D, the support shafts 33 come into contact with second edges of the sectoral holes 31d of the display screen support member 31 and stop rotating along arrow D, as shown in FIG. 20. Thus, according to this embodiment, the display screen portion 40 is rotatable from the state supported by the display screen support member 31 perpendicularly to the display screen turning apparatus 10 as shown in FIG. 16 by about 10° along arrow D, as shown in FIG. 20.

When the user stops rotating the display screen portion 40 supported by the display screen support member 31 perpendicularly to the display screen turning apparatus 10 as shown in FIG. 16 at an arbitrary rotational angle of the display screen portion 40 in the range of 0° to about 90° along arrow C or in the range of 0° to about 10° along arrow D, the rotational angle of the display screen support member 31 is maintained by the frictional force between the display screen support member 31 and the vertical support members 32, due to the disc springs 35 (see FIG. 9) pressing the display screen support member 31 and the vertical support members 32 to hold the same therebetween through the pressure-contact plates 37 (see FIG. 9).

According to this embodiment, as hereinabove described, the display screen turning apparatus 10 comprises the stop members 19 and 20 inserted into the rectangular holes 11c and 11d provided in the upright portions 11a and 11b of the base 11 for pressing the disc springs 15 and 16 and holding the same in deflected states, whereby assembling workability can be improved through a simple operation of deflecting the disc springs 15 and 16 with a jig or the like to produce prescribed pressing force and inserting the stop members 19 and 20 into the holes 11c and 11d of the upright portions 11a and 11b of the base 11. Further, the display screen turning apparatus comprises the disc springs 15 and 16 of metal fitted onto the upright portions 11a and 11b of the base 11 rotatably holding the rotating member 12 to press the rotating member 12, whereby the rotating member 12 regularly rotates in the state pressed by the disc springs 15 and 16 with the prescribed pressing force, and can be inhibited from jolting during rotation.

According to this embodiment, the upright portions 11a and 11b of the base 11 are so integrally formed on the base 11 that no operation is required for mounting upright portions manufactured as individual components on the base 11, whereby the assembling workability can be further improved.

According to this embodiment, the rotating member 12 includes the side surface portions 12*d* and 12*e* arcuate in plan view and the base 11 includes the upright portion 11*b* provided on the rotation center thereof and the upright portions 11*a* provided at prescribed distances from the upright portion 11*b* while the upright portions 11*a* of the base 11 have the side surface portions 11*f* and 11*g* so that the side surface portions 12*d* and 12*e* of the rotating member 12 substantially come into contact with the side surface portions 11*f* and 11*g* of the upright portions 11*a* respectively when the rotating member 12 rotates in the horizontal plane so that horizontal movement of the rotating member 12 can be regulated, whereby the rotating member 12 can be inhibited from rotating in a state where the axis of rotation is horizontally decentered when rotating on the upper surface of the base 11.

According to this embodiment, the upright portions of the base 11 include the upright portion 11*b* provided on the rotation center of the rotating member 12 and the upright portions 11*a* provided at the prescribed distances from the upright portion 11*b* while the upright portions 11*a* are substantially symmetrically provided on both sides of the rotating member 12 with respect to the upright portion 11*b* in plan view so that the rotating member 12 is rotatably held by the pressing members 13, the disc springs 15, the plate members 17 and the stop members 19 in the vicinity of the upright portions 11*a* of the base 11 provided on both sides of the rotating member 12 at substantially symmetrical distances from the rotation center, whereby the rotational torque of the rotating member 12 can be inhibited from dispersion resulting from the rotational direction (along arrow A or B in FIG. 1).

According to this embodiment, the base 11 is made of sheet metal while the upright portions 11*a* and 11*b* are integrally provided on the base 11 by partially uprighting the base 11, whereby the upright portions 11*a* and 11*b* can be easily formed at the same time when the base 11 of sheet metal is formed by press working.

According to this embodiment, the circular disc springs 15 and 16 are employed as platelike springs, whereby the pressing force for deflecting the disc springs 15 and 16 by the stop members 19 and 20 respectively can uniformly act in the form of circles having constant radii along the upright portions 11*a* and 11*b* of the base 11 respectively.

According to this embodiment, the display screen turning apparatus 10 comprises the pressing members 13 of metal for pressing the rotating member 12 rotatably with respect to the base 11 while the base 11 is provided with the projecting portions 11*e*, coming into contact with the lower surface 12*a* of the rotating member 12, formed by press working on the prescribed regions (four portions) of the base 11 opposed to the rotating member 12 and the rotating member 12 is provided with the projecting portions 12*c*, coming into contact with the pressing surfaces 13*b* of the pressing members 13, formed by press working on the prescribed regions (two portions) of the upper surface 12*b* of the rotating member 12 opposed to the pressing members 13 so that the rotating member 12 rotates while coming into contact with the base 11 and the pressing members 13 only on the projecting portions 11*e* (four portions) and the projecting portions 12*c* (two portions), whereby a range of abrasions of the base 11, the rotating member 12 and the pressing members 13 resulting from rotational friction can be limited. Further, abrasions of the base 11, the rotating member 12 and the pressing members 13 resulting rotational friction are limited to portions concealed from the user, whereby the liquid crystal display 100 can be prevented from damage in appearance.

According to this embodiment, the rotating member 12 is so formed as to rotate in the horizontal plane within the range (about ±45°) capable of bringing the projecting portions 12*c* into contact with the pressing members 13, whereby the rotating member 12, receiving pressing force from the pressing members 13 through the projecting portions 12*c* regardless of the rotational angle, can regularly attain stable rotation.

According to this embodiment, the pressing members 13 are formed by the pressing surfaces 13*b* pressing the rotating member 12 and the leg surfaces 13*d* connected to the pressing surfaces 13*b* and provided with the projecting portions 13*c* on the forward ends thereof to have the substantially L-shaped longitudinal cross sections while the base 11 is provided with the angular holes 11*m* receiving the projecting portions 13*c* of the pressing members 13 and serving as supporting points for vertically rotatably supporting the pressing members 13 so that the pressing surfaces 13*b* of the pressing members 13 vertically rotate about the projecting portions 13*c* inserted into the angular holes 11*m* of the base 11 when the stop members 19 are inserted into the upright portions 11*a* of the base 11 for bringing the pressing members 13 into contact with the rotating member 12, whereby the pressing members 13 can be easily brought into contact with the rotating member 12 through the projecting portions 12*c* without jolting.

According to this embodiment, the display screen turning apparatus 10 further comprises the plate members 17 and 18 of metal, having larger plane areas than the disc springs 15 and 16, inserted into the upright portions 11*a* and 11*b* of the base 11 and arranged between the disc springs 15 and 16 and the stop members 19 and 20 so that the pressing force of the disc springs 15 and 16 acts on the stop members 19 and 20 through the plate members 17 and 18 of metal having larger plane areas (installation areas) than the disc springs 15 and 16, whereby the stop members 19 and 20 can receive the pressing force from the disc springs 15 and 16 on the overall regions of the end surface portions 19*b* and 20*b* coming into contact with the plate members 17 and 18. Thus, the stop members 19 and 20 can stably hold the disc springs 15 and 16.

According to this embodiment, the stop members 19 and 20 are in the form of plates and receive the pressing force of the disc springs 15 and 16 on the end surface portions 19*a*, 19*b*, 20*a* and 20*b* in the direction H perpendicular to the thickness direction T so that the pressing force of the disc springs 15 and 16 can be received by the strong end surface portions 19*a*, 19*b*, 20*a* and 20*b* of the stop members 19 and 20 in the direction H perpendicular to the thickness direction T, whereby the stop members 19 and 20 can be inhibited from deformation resulting from the pressing force of the disc springs 15 and 16.

According to this embodiment, the end surface portions 19*a* and 20*a* of the stop members 19 and 20 are tapered along the longitudinal direction where the stop members 19 and 20 extend in a platelike manner so that the sectional heights H of the stop members 19 and 20 received in the holes 11*c* and 11*d* change along the tapered shapes of the end surface portions 19*a* and 20*a* when the stop members 19 and 20 are inserted into the holes 11*c* and 11*d* of the upright portions 11*a* and 11*b* of the base 11 respectively, whereby the pressing force for deflecting the disc springs 15 and 16 can be varied with the insertion margins. Thus, the operator can produce desired pressing force on the pressing members 13 and 14 by inserting the stop members 19 and 20 into the holes 11*c* and 11*d* of the upright portions 11*a* and 11*b* respectively by prescribed insertion margins, whereby the assembling workability for the display screen turning apparatus 10 can be improved as compared with a case of controlling torque in fastening with bolts/nuts.

Although the present invention has been described and illustrated in detail, it is clearly understood that the same is by way of illustration and example only and is not to be taken by way of limitation, the spirit and scope of the present invention being limited only by the terms of the appended claims.

For example, while the display screen turning apparatus 10 is provided on the liquid crystal display 100 in the aforementioned embodiment, the present invention is not restricted to this but the inventive display screen turning apparatus may alternatively be provided on another display such as an organic EL display having a display screen other than a liquid crystal screen.

While the display screen turning apparatus 10 comprises the disc springs 15 and 16 of metal as platelike springs fitted onto the upright portions 11a and 11b of the base 11 rotatably holding the rotating member 12 for pressing the rotating member 12 in the aforementioned embodiment, the present invention is not restricted to this but the display screen turning apparatus 10 may alternatively comprise plate springs or the like other than disc springs, so far as these springs are platelike.

While the base 11 is made of sheet metal and the upright portions 11a and 11b thereof are integrally formed by partially uprighting the base 11 in the aforementioned embodiment, the present invention is not restricted to this but the base 11 may alternatively be made of resin, and the upright portions 11a and 11b may be integrally formed when the base 11 is resin-molded.

While the circular rib 14c coming into contact with the rotating member 12 is provided by press working on the prescribed region of the lower surface 14b of the pressing member 14 opposed to the rotating member 12 in the aforementioned embodiment, the present invention is not restricted to this but a plurality of circularly arranged projecting portions coming into contact with the rotating member 12 may alternatively be provided by press working on prescribed regions of the lower surface 14b of the pressing member 14 opposed to the rotating member 12.

While the display screen turning apparatus 10 comprises the plate members 17 and 18 of metal, having larger plane areas than the disc springs 15 and 16 of metal, inserted into the upright portions 11a and 11b of the base 11 and arranged between the disc springs 15 and 16 of metal and the stop members 19 and 20 in the aforementioned embodiment, the present invention is not restricted to this but the display screen turning apparatus 10 may alternatively comprise plate members of resin, having larger plane areas than the disc springs 15 and 16 of metal, inserted into the upright portions 11a and 11b of the base 11 and arranged between the disc springs 15 and 16 of metal and the stop members 19 and 20.

While the upright portions 11a of the base 11 are provided in a pair on both side portions with respect to the rotation center (upright portion 11b) of the rotating member 12 in the aforementioned embodiment, the present invention is not restricted to this but at least three upright portions 11a of the base 11 may alternatively be provided at regular angles from the rotation center of the rotating member 12 (on three portions at angles of 120°, for example).

While the projecting portions 12c coming into contact with the pressing surfaces 13b of the pressing members 13 are provided on the upper surface 12b of the rotating member 12 in the aforementioned embodiment, the present invention is not restricted to this but projecting portions or the like coming into contact with the upper surface 12b of the rotating member 12 may alternatively be provided on the pressing surfaces 13b of the pressing members 13.

What is claimed is:

1. A display screen turning apparatus comprising:
   a rotating member mounted with a display screen and rotatable in a horizontal plane;
   a base, rotatably holding said rotating member, provided with an upright portion having a hole;
   a platelike spring of metal fitted onto said upright portion of said base for pressing said rotating member; and
   a stop member inserted into said hole of said upright portion of said base for pressing said platelike spring and holding said platelike spring in a deflected state, wherein
   said rotating member includes a first side end surface portion arcuate in plan view while said upright portion of said base includes a first upright portion provided on the rotation center of said rotating member and a second upright portion provided at a prescribed distance from said first upright portion,
   said second upright portion of said base has a second side end surface portion, and
   said first side end surface portion of said rotating member substantially comes into contact with said second side end surface portion of said second upright portion when said rotating member rotates in said horizontal plane, so that horizontal movement of said rotating member can be regulated.

2. The display screen turning apparatus according to claim 1, wherein
   said upright portion of said base includes a first upright portion provided on the rotation center of said rotating member and second upright portions provided at a prescribed distance from said first upright portion, and
   said second upright portions of said base are substantially symmetrically provided on both sides of said rotating member with respect to said first upright portion in plan view.

3. The display screen turning apparatus according to claim 1, wherein
   said upright portion of said base is integrally formed on said base.

4. The display screen turning apparatus according to claim 3, wherein
   said base is made of sheet metal, and said upright portion of said base is formed integrally with said base by partially uprighting said base.

5. The display screen turning apparatus according to claim 1, wherein
   said platelike spring is an annularly formed disc spring.

6. The display screen turning apparatus according to claim 1, further comprising a pressing member of metal for pressing said rotating member rotatably with respect to said base, wherein
   said base has a first projecting portion coming into contact with said rotating member on a prescribed region of a surface opposed to said rotating member, and
   said rotating member or said pressing member has a second projecting portion coming into contact with said pressing member or said rotating member on a prescribed region of a surface opposed to said pressing member or said rotating member.

7. The display screen turning apparatus according to claim 6, wherein
   said rotating member is so formed as to rotate in a range capable of bringing said second projecting portion into contact with said pressing member or said rotating member when rotating in said horizontal plane.

8. The display screen turning apparatus according to claim 6, wherein
said pressing member is formed by a first surface pressing said rotating member and a second surface connected to said first surface and provided with a protrusion on the forward end thereof to have a substantially L-shaped longitudinal section, and
said base further has an angular hole receiving said protrusion of said pressing member and serving as a supporting point vertically rotatably supporting said pressing member.

9. The display screen turning apparatus according to claim 1, further comprising a plate member of metal, having a larger plane area than said platelike spring, inserted into said upright portion of said base and arranged between said platelike spring and said stop member.

10. The display screen turning apparatus according to claim 1, wherein
said stop member is in the form of a plate, and receives the pressing force of said platelike spring on an end surface portion perpendicular to the thickness direction.

11. The display screen turning apparatus according to claim 10, wherein
said end surface portion of said stop member is tapered along the longitudinal direction where said stop member extends in a platelike manner.

12. A display screen turning apparatus comprising:
a rotating member mounted with a display screen and rotatable in a horizontal plane;
a base, rotatably holding said rotating member, provided with an upright portion having a hole;
a platelike spring of metal fitted onto said upright portion of said base for pressing said rotating member;
a stop member inserted into said hole of said upright portion of said base for pressing said platelike spring and holding said platelike spring in a deflected state;
a pressing member of metal for pressing said rotating member rotatably with respect to said base; and
a plate member of metal, having a larger plane area than said platelike spring, inserted into said upright portion of said base and arranged between said platelike spring and said stop member, wherein
said base is made of sheet metal, and said upright portion of said base is formed integrally with said base by partially uprighting said base,
said base has a first projecting portion coming into contact with said rotating member on a prescribed region of a surface opposed to said rotating member,
said rotating member or said pressing member has a second projecting portion coming into contact with said pressing member or said rotating member on a prescribed region of a surface opposed to said pressing member or said rotating member, and
said stop member is in the form of a plate, and receives the pressing force of said platelike spring on an end surface portion perpendicular to the thickness direction.

13. The display screen turning apparatus according to claim 12, wherein
said rotating member includes a first side end surface portion arcuate in plan view while said upright portion of said base includes a first upright portion provided on the rotation center of said rotating member and a second upright portion provided at a prescribed distance from said first upright portion,
said second upright portion of said base has a second side end surface portion, and
said first side end surface portion of said rotating member substantially comes into contact with said second side end surface portion of said second upright portion when said rotating member rotates in said horizontal plane, so that horizontal movement of said rotating member can be regulated.

14. The display screen turning apparatus according to claim 12, wherein
said upright portion of said base includes a first upright portion provided on the rotation center of said rotating member and second upright portions provided at a prescribed distance from said first upright portion, and
said second upright portions of said base are substantially symmetrically provided on both sides of said rotating member with respect to said first upright portion in plan view.

15. The display screen turning apparatus according to claim 12, wherein
said platelike spring is an annularly formed disc spring.

16. The display screen turning apparatus according to claim 12, wherein
said rotating member is so formed as to rotate in a range capable of bringing said second projecting portion into contact with said pressing member or said rotating member when rotating in said horizontal plane.

17. The display screen turning apparatus according to claim 12, wherein
said pressing member is formed by a first surface pressing said rotating member and a second surface connected to said first surface and provided with a protrusion on the forward end thereof to have a substantially L-shaped longitudinal section, and
said base further has an angular hole receiving said protrusion of said pressing member and serving as a supporting point vertically rotatably supporting said pressing member.

18. The display screen turning apparatus according to claim 12, wherein
said end surface portion of said stop member is tapered along the longitudinal direction where said stop member extends in a platelike manner.

* * * * *